April 12, 1966 W. J. NUGENT 3,245,697
INFORMATION CARD
Filed Jan. 13, 1964 2 Sheets-Sheet 1
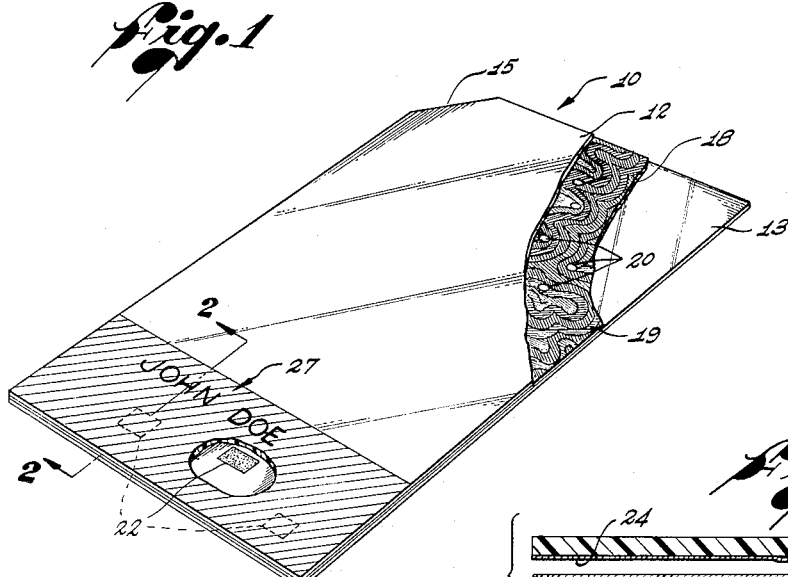
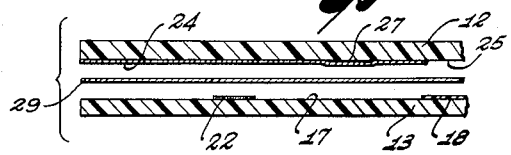
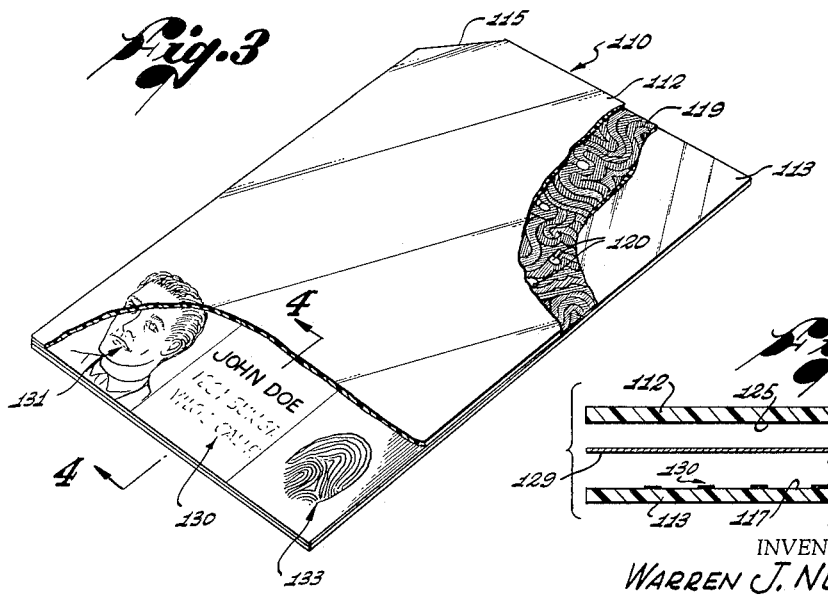
INVENTOR.
WARREN J. NUGENT
BY Fulwider Patton,
Rieber, Lee, and Utecht
Attorneys April 12, 1966  W. J. NUGENT  3,245,697
INFORMATION CARD
Filed Jan. 13, 1964  2 Sheets-Sheet 2
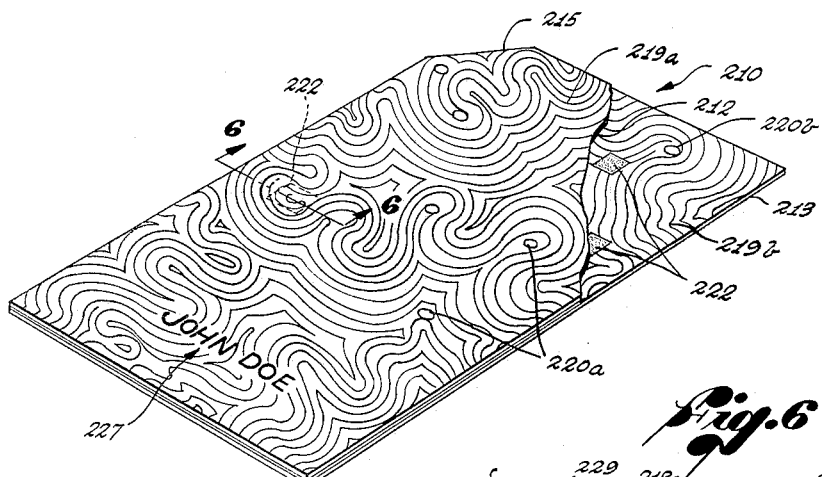
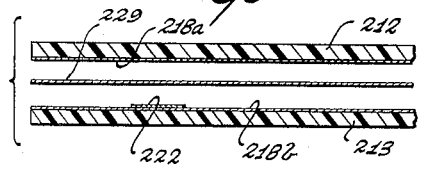
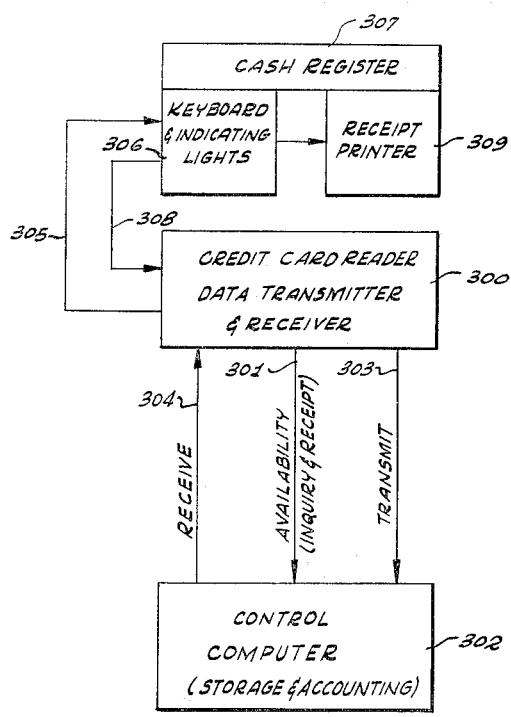
INVENTOR.
WARREN J. NUGENT
BY Fulwider, Patton,
Rieber, Lee, and Utecht
Attorneys United States Patent Office 3,245,697
Patented Apr. 12, 1966

3,245,697
INFORMATION CARD
Warren J. Nugent, Northridge, Calif., assignor to Universal Electronic Credit Systems, Inc., Los Angeles, Calif., a corporation of California
Filed Jan. 13, 1964, Ser. No. 337,380
8 Claims. (Cl. 283—7)

This invention relates generally to information cards, and more particularly to improvements in information cards of the credit card type, which may be used for sales transactions, bank deposits and withdrawals, and the like.

In recent years, credit cards have come into popular use for transactions in a wide variety of establishments, such as restaurants, hotels, department stores, etc. Such credit cards are usually adapted to indicate the proper bearer or owner by name and to further identify by appropriate numbers and/or letters the account against which each transaction is to be charged.

Typically, the credit cards of the prior art have consisted of a base member, of plastic, cardboard, or the like, with the account number and bearer or owner identification printed or embossed directly upon the face of the base member. With the embossed cards, a suitable printing device is usually used to transfer the information on the face of the card to a multiple copy assemblage of a transaction record. With a credit card of the printed variety, the information on the card is usually transcribed by hand upon the transaction record. In both cases, however, the balance of the transaction information, such as items purchased and cost, must be transcribed as a separate step. After the transaction has been completed, the credit card bearer is given one copy of the transaction record, the establishment keeps a second copy, and a third copy is forwarded to the credit card company for payment. It will be apparent, therefore, that each credit card transaction takes a relatively great amount of time, as opposed to the much simpler and more direct cash register transaction. Such inefficiency manifests itself in increased labor cost per sale transaction. Hence, credit card companies and establishments catering to the credit card trade have long sought a credit card system which would simplify transaction procedures.

A number of additional difficulties have been encountered with the credit cards of the prior art. In this connection, since information is printed or embossed upon the outer surface of each credit card, the information is subject to damage or alternation by wear, intentional or accidental mutilation, and exposure to the elements. In addition, such credit cards can be easily counterfeited, and an establishment will usually not be aware that a card is counterfeit until that fact is brought to light by the credit card company upon receipt of a transaction record for that card. Furthermore, there is no way for an establishment to determine whether or not a particular credit card has been lost or stolen, except by reference to lists which are periodically published and circulated by the credit card companies. However, there is an inherent lag between receipt of such lists by each establishment and the report of a lost or stolen credit card to the credit card company. Hence, a considerable amount of charges can be run up with a lost or stolen credit card before establishments are made aware of the improper status of the card. Moreover, during the height of the business hours, it is usually impractical to refer to such lists each time the establishment is presented with a credit card. Hence, many improper transactions may initially go unnoticed even though the establishment has already been notified of the fact that a particular credit card has been reported lost or stolen.

A further difficulty with the card cards of the prior art has been the inability to establish credit limits in various transaction categories and automatically inform the establishments when such credit limits have been exceeded. Thus, there has been a tendency for some credit card owners to unwittingly or deliberately extend their credit beyond their means.

Accordingly, it is an object of the present invention to provide a new and improved information card which overcomes the above and other disadvantages of the prior art.

Another object is to provide a new and improved credit card capable of presenting a greater density of information than previous credit cards with substantially no increase in physical dimensions.

A further object of this invention is the provision of a new and improved information card which can be electrically identified for authenticity.

Still another object is to provide a new and improved information card which cannot be readily counterfeited.

Another object of the present invention is the provision of a new and improved information card having smooth outer faces with no identifying information on any other face.

A still further object is to provide a new and improved information card having coded information which is not susceptible to alteration, wear, or exposure to the elements.

Another object of this invention is to provide a new and improved credit card for use in a radiant energy readout system.

Still another object of this invention is the provision of a new and improved credit card capable of use in an electrical system for rapidly indicating exceeded credit limits and lost or stolen credit card status, and for recording of each transaction directly at a central accounting facility as each transaction is completed.

The above and other objects and advantages of this invention will be better understood by reference to the following detailed description, when considered in connection with the accompanying drawings of illustrative embodiments thereof, and wherein:

FIGURE 1 is a perspective view, portions being broken away, of one embodiment of a new and improved credit card in accordance with the present invention;

FIGURE 2 is an exploded, fragmentary sectional view, taken along line 2—2 in FIGURE 1, and illustrating the laminated construction of the credit card;

FIGURE 3 is a perspective view, portions being broken away, of another embodiment of a credit card in accordance with the invention;

FIGURE 4 is an exploded, fragmentary sectional view, taken along the line 4—4 in FIGURE 3;

FIGURE 5 is a perspective view, portions being broken away, of still another embodiment of a credit card in accordance with the present invention;

FIGURE 6 is an exploded, fragmentary sectional view, taken along the line 6—6 in FIGURE 5; and FIGURE 7 is a block diagram of a typical system for using the credit card of the present invention.

Briefly, the present invention provides information in the form of a coded array of imperforate, transparent areas in an otherwise opaque card member. The card member is a multi-layer assembly wherein the information layers are laminated between two outer protective layers. A coded arrangement of material having permanent and identifiable electrical characteristics, e.g. magnetic or electrostatic, is also laminated between the two outer layers of the card member and concealed from view. The physical construction of the laminated assembly is such that any attempt at separating the layers to locate the identifying material results in automatic destruction of the coded configuration. The card member is also provided with appropriate means for identifying the proper bearer or owner of the card, as by name and/or photograph which become visible only upon exposure to ultraviolet light or the like.

Referring now to the drawings, and more particularly to FIGURES 1 and 2 thereof, there is shown a credit card 10 in accordance with the present invention. The credit card 10 includes two outer protective layers, an upper layer 12 and a lower layer 13. The layers 12, 13 may be fabricated of any transparent, preferably flexible material, such as plastic or the like, and the peripheral physical dimensions of both layers are held to close tolerances so that the credit card reading device (not shown) will only accept credit cards having the prescribed physical dimensions. To this end, one corner 15 of the credit card 10 is beveled to insure proper insertion and alignment of the credit card within the card reader.

The inner face 17 of the lower layer 13 has an information coating or layer 18 thereon. The information layer 18 may be provided upon the inner face 17 of the layer 13 by any appropriate process such as printing, chemical deposition, silk screening, painting, photographic techniques, etc. For example, the lower layer 13 can be a photographic film having a transparent base layer with a photographic emulsion layer which can be exposed and developed to provide the desired information layer 18.

The information layer 18 comprises an opaque background in the form of an intricate scroll 19 having a plurality of clear, transparent areas 20 in a coded array indicative of the specified information to be recorded and conveyed by the card 10. The transparent areas 20 present the information in digital form and, by virtue of their transmissive properties can be read out simply by illuminating the credit card from one side with any appropriate source of radiant energy and impinging the transmitted radiant energy beams upon a suitable matrix of photosensitive elements of either the photoelectric or photoconductive type.

By locating the coded array of transparent areas 20 within an intricate scroll camouflage, the precise locations of the transparent areas are not as readily apparent. Moreover, by recording information in digital form, an extremely high density of information may be recorded on a relatively small card, and such information may include, in addition to an account number, the credit limits for various types of transactions and groups of items.

In addition to applying an information layer to the inner face 17 of the lower layer 13, a plurality of deposits 22 of a material having permanent, identifiable electrical characteristics are applied to the surface 17 at coded locations upon a portion of the surface not occupied by the information layer 18. The deposits 22 may be permanent magnetic or electrostatic material, e.g. Alnico ink, electrets or the like, or any other material having electrical properties which are not readily alterable and which can be measured by an appropriate card reading device. In this connection, the deposits 22 indicate the genuineness or authenticity of the credit card 10 by virtue of the quantitative measure of their electrical properties. This measure of the electrical properties of the deposits 22 may be a direct measure of any individual deposit or a differential determination upon comparison of the electrical properties of two or more such deposits.

The deposits 22 are concealed from view in the assembled card 10 by an opaque coating 24 over that portion of the inner face 25 of the upper layer 12 which overlies the portion of the lower layer 13 carrying the electrically identifiable deposits. Prior to application of the coating 24 on the surface 25, the name of the proper card bearer is printed at 27 upon the inner surface of the upper layer 12. The name 27 is printed with ink which is normally invisible and which fluoresces only when subjected to ultraviolet radiation.

After the upper and lower card layers 12, 13 have been processed in the aforedescribed manner, a layer 29 of any suitable adhesive is applied between the inner faces of the layers and the layers are laminated together. The edges of the card are then heat sealed to complete the assembly.

In order to counterfeit the card 10, it would be necessary to know the precise location and chemical composition of the deposits 22. However, if an attempt is made to separate the layers 12, 13 of the card 10, the adhesion of the deposits 22 to the layers will automatically result in destruction of the deposit configuration, due to disintegration of the deposits when the layers are separated.

It will be apparent that the credit card 10 of FIGURE 1 has smooth, imperforate outer surfaces, and the information contained therein is shielded from wear, mutilation, and exposure to the elements.

Referring now to FIGURES 3 and 4 of the drawings, there is shown a second embodiment of a credit card 110 in accordance with the present invention. In this connection, the elements 112–129 of the credit card 110 denote like or corresponding elements for the credit card 110 as the reference numerals 12–29 for the credit card 10 in FIGURES 1 and 2.

In the embodiment shown in FIGURES 3 and 4, the deposits 22 and opaque coating 24 have been eliminated. Instead, the upper layer 112 of the credit card is completely transparent over its entire length, and the authenticity of the credit card is determined by reading selected portions of the opaque scroll 119. Preferably, the entire scroll 119 or portions thereof contain a material having permanent, identifiable electrical characteristics as previously described in connection with the deposits 22 in FIGURES 1 and 2. Alternatively, the scroll 119 may be scanned for flaws by appropriate script reading and counterfeit currency detecting systems well known in the art.

The inner face 117 of the lower layer 113, or alternatively the inner face 125 of the upper layer 112, has printed thereon a name and address 130, a photograph 131, and a fingerprint 133 identifying the proper bearer of the credit card 110. As in the case of the name 27 in FIGURE 1, the name and address 130 and photograph 131 are printed with ink which is visible only when subjected to ultraviolet radiation. The fingerprint 133 is optional and may be read by an appropriate fingerprint analyzing device (not shown) and compared with the fingerprint of the card bearer pressed onto a window after he inserts the credit card into the card reading device.

Referring now to FIGURES 5 and 6 of the drawings, there is shown a third embodiment of a credit card 210 in accordance with the present invention. In this connection, the reference numerals 212–229 denote like or corresponding elements for the credit card 210 as the reference numerals 12–29 for the credit card 10 in FIGURES 1 and 2.

The primary distinction between the credit card 210 of FIGURE 5 and the credit card 10 of FIGURE 1 is that both of the layers 212, 213 of the card 210 have information layers 218a, 218b, respectively, applied to the inner faces thereof prior to lamination to form the completed credit card. To this end, the transparent areas 220a in the upper layer 212 and the transparent areas 220b and the lower layer 213 must be in registry so that radiant energy can pass through the coded array presented by the card.

Authenticity of the credit card 210 is determined by a plurality of deposits 222 upon either the information layer 218a or 218b prior to final assembly of the card. In this connection, the deposits 222 are, as in the case of the deposits 22 in FIGURE 1, of a material having permanent, identifiable electrical characteristics. However, since the deposits 222 overlie the information layers 218a, 218b, the coded locations of the deposits must be such that they do not overlie any of the transparent areas 220a, 220b.

Referring now to FIGURE 7, a typical system for utilizing the credit cards of the present invention is next described. In recording a transaction, the credit card is inserted into a credit card reader 300 containing a data transmitter and receiver section. As soon as the credit card reader has read the information upon the credit card, it sends out a signal along line 301 to a central control computer 302 requesting a transmit gate for transmitting the card information to the computer 302. The control computer 302 is a digital computer which stores all of the pertinent information regarding the accounts represented by the credit cards used by the system.

When a transmit gate is available, the card reading data transmitter transmits the card information to the computer 302 over line 303. On the basis of the information received, the control computer 302 then sends back over line 304 information regarding the credit limits on various items and transactions for the particular credit card, whether or not the particular account is overdrawn, and whether or not the credit card has been reported lost or stolen. This information is conveyed from the receiver 300 over line 305 to an appropriate keyboard and indicating light system 306 which is part of a modified cash register 307.

If the indicating lights in section 306 show everything to be in order for the particular account and credit card, the cash register keyboard is operated to write up the transaction. Operation of the keyboard conveys the transaction information over line 308 to the data transmitter 300 which, in turn, transmits the digital information to the control computer 302 so that the transaction is immediately recorded at the central accounting unit having cognizance of the account being charged with the transaction. Hence, the usual delay in forwarding a receipt to the credit card company is avoided.

The keyboard 306 of the cash register 307 also automatically operates a receipt printer 309 to provide a written verification record of the transaction for the credit car bearer, the establishment, and/or the credit card company.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:
1. A card to enable the bearer to be identified when digital data on the card is read with electronic data processing equipment comprising a pair of light transparent sheets having laminated between them generally light opaque sheet means to form said card as a sheet like member having a generally light opaque appearance, said light opaque sheet means including a multiplicity of discrete, small, dot like, light transparent areas, each of said areas being light transparent from one side of the light opaque sheet means to the other side of the light opaque sheet means, each of said dot-like areas being sufficiently small to maintain the generally light opaque appearance of the card but being of sufficient size to enable digital data indications to be derived in response to light from a source in said equipment being transmitted from one side of the card to a detector in said equipment located at the other side of the card, said areas only being located at predetermined discrete locations on the light opaque sheet means to indicate coded digital data indicative of the identification of the card bearer, the areas on each of said cards being located at different discrete locations to identify different card bearers, said card further including permanent fraud preventing indicia located in non-overlapping relationship with the areas, said permanent indicia being located at the same region on each of said cards to provide an indication of the authenticity of said cards.

2. The card of claim 1 wherein said fraud preventing indicia comprises at least one body of material having permanent, identifiable electrical characteristics included in said light opaque sheet means.

3. The card of claim 1 wherein said light opaque sheet means comprises a pair of opaque laminations, one of said laminations being bonded to the inner face of each of said transparent sheets, said laminations including transparent areas in registry to form said small, dot-like transparent areas.

4. An informaiton card as set forth in claim 1, wherein said fraud preventing indicia includes at least one permanently magnetized area within said member.

5. An information card as set forth in claim 1, wherein said fraud preventing indicia includes at least one permanently polarized electrostatic area within said member.

6. An information card as set forth in claim 1, wherein said opaque sheet means includes an intricate scroll.

7. An information card as set forth in claim 6, wherein said portions of said scroll are of a permanently magnetized material.

8. An information card as set forth in claim 6, wherein said portions of said scroll are of an electrostatic material which has been permanently polarized.

References Cited by the Examiner

UNITED STATES PATENTS

| 2,330,718 | 9/1943 | Kallman | 283—8 |
| 2,835,993 | 5/1958 | Whitehead | 40—2.2 |
| 2,984,030 | 5/1961 | Hannon | 40—2.2 |
| 3,048,697 | 8/1962 | Cavanaugh et al. | 283—6 X |

OTHER REFERENCES

IBM Technical Disclosure Bulletin, Parry, vol. 3, No. 6, November 1960.

EUGENE R. CAPOZIO, *Primary Examiner.*

LAWRENCE CHARLES, *Examiner.*